United States Patent
Dixon

(10) Patent No.: US 10,386,099 B2
(45) Date of Patent: Aug. 20, 2019

(54) DESICATING SYNTHETIC REFRIGERATION OIL COMPOSITION FOR FLUORO-OLEFIN REFRIGERATION SYSTEMS

(71) Applicant: SHRIEVE CHEMICAL PRODUCTS, INC., The Woodlands, TX (US)

(72) Inventor: Elizabeth Dixon, Hampshire (GB)

(73) Assignee: SHRIEVE CHEMICAL PRODUCTS, INC., The Woodlands, TX (US)

(*) Notice: Subject to any disclaimer, the term of this patent is extended or adjusted under 35 U.S.C. 154(b) by 0 days.

(21) Appl. No.: 15/111,783

(22) PCT Filed: Jan. 15, 2015

(86) PCT No.: PCT/US2015/011608
§ 371 (c)(1),
(2) Date: Jul. 14, 2016

(87) PCT Pub. No.: WO2015/109095
PCT Pub. Date: Jul. 23, 2015

(65) Prior Publication Data
US 2016/0334147 A1 Nov. 17, 2016

Related U.S. Application Data

(60) Provisional application No. 61/928,331, filed on Jan. 16, 2014.

(51) Int. Cl.
| | |
|---|---|
| C09K 5/04 | (2006.01) |
| F25B 31/00 | (2006.01) |
| C10M 107/34 | (2006.01) |
| C10M 171/00 | (2006.01) |
| C10M 105/38 | (2006.01) |
| F25B 47/00 | (2006.01) |

(52) U.S. Cl.
CPC ............ *F25B 31/002* (2013.01); *C09K 5/045* (2013.01); *C10M 105/38* (2013.01); *C10M 107/34* (2013.01); *C10M 171/008* (2013.01); *F25B 47/003* (2013.01); *C09K 2205/126* (2013.01); *C10M 2207/2835* (2013.01); *C10M 2209/103* (2013.01); *C10M 2209/105* (2013.01); *C10M 2209/108* (2013.01); *C10M 2209/109* (2013.01); *C10M 2209/1033* (2013.01); *C10M 2209/1055* (2013.01); *C10M 2209/1085* (2013.01); *C10M 2209/1095* (2013.01); *C10N 2220/022* (2013.01); *C10N 2220/027* (2013.01); *C10N 2220/028* (2013.01); *C10N 2220/302* (2013.01); *C10N 2220/303* (2013.01); *C10N 2220/306* (2013.01); *C10N 2230/10* (2013.01); *C10N 2230/26* (2013.01); *C10N 2230/36* (2013.01); *C10N 2230/70* (2013.01); *C10N 2240/30* (2013.01); *F25B 2500/16* (2013.01)

(58) Field of Classification Search
CPC ............... C09K 5/045; C10M 171/008; C10N 2030/00; C10N 2030/06; C10N 2030/08; C10N 2030/10; C10N 2030/12; C10N 2030/18; C10N 2030/20; C10N 2040/30
USPC ........................................................ 252/68
See application file for complete search history.

(56) References Cited

U.S. PATENT DOCUMENTS

| | | | |
|---|---|---|---|
| 4,755,316 A | 7/1988 | Magid et al. | |
| 4,851,144 A | 7/1989 | McGraw et al. | |
| 5,152,926 A | 10/1992 | Brown | |
| 5,498,356 A | 3/1996 | Kamakura et al. | |
| 5,976,399 A | 11/1999 | Schnur | |
| 6,190,574 B1 | 2/2001 | Nakagawa et al. | |
| 6,248,256 B1 | 6/2001 | Nagao et al. | |
| 7,018,558 B2 | 3/2006 | Schnur et al. | |
| 7,291,713 B2 | 11/2007 | Yamasaki et al. | |
| 7,534,366 B2 | 5/2009 | Singh et al. | |
| 8,033,120 B2 | 10/2011 | Singh et al. | |
| 8,065,882 B2 | 11/2011 | Singh et al. | |
| 9,976,106 B2 * | 5/2018 | Kaneko | C10M 171/008 |
| 2001/0023934 A1 | 9/2001 | Corr | |
| 2004/0256594 A1 | 12/2004 | Singh et al. | |
| 2005/0127320 A1 | 6/2005 | Fahl et al. | |
| 2007/0069175 A1 | 3/2007 | Thomas et al. | |

(Continued)

FOREIGN PATENT DOCUMENTS

| | | |
|---|---|---|
| EP | 0913457 A2 | 5/1999 |
| EP | 3045515 A1 | 7/2016 |

(Continued)

OTHER PUBLICATIONS

Weissler, Paul; "Hybrid Oils, Trace Dyes and the Cross-Contamination Issue—Special Recovery/Recycle/Recharge Techniques Required when Servicing Hybrids with Electric-Drive Compressors," MACS Service Reports, Mar. 2008, 8 p.

(Continued)

*Primary Examiner* — Douglas J Mcginty
(74) *Attorney, Agent, or Firm* — Conley Rose, P.C.

(57) ABSTRACT

A working fluid for use in a compression refrigeration, air conditioning or heat pump system, is described, which has a refrigerant composed of a fluoro-olefin, and a lubricant which is a mixture of polyol ester and a polyoxyalkylene glycol, and the polyol ester is present in an amount of at least 50% by weight based on the total weight of the polyol ester and the polyoxyalkylene glycol. A lubricant, being a mixture of a polyol ester and a polyoxyalkylene glycol, is described and comprises at least 10% by weight of polyoxyalkylene glycol based on the total weight of the polyol ester and the polyoxyalkylene glycol.

16 Claims, No Drawings

(56) References Cited

U.S. PATENT DOCUMENTS

| | | | |
|---|---|---|---|
| 2007/0164252 A1 | 7/2007 | Tokiai | |
| 2010/0205980 A1 | 8/2010 | Dixon et al. | |
| 2010/0282999 A1 | 11/2010 | Shimomura et al. | |
| 2011/0190184 A1 | 8/2011 | Kalley | |
| 2011/0204279 A1 | 8/2011 | Minor et al. | |
| 2011/0272624 A1 | 11/2011 | Serrano et al. | |
| 2015/0027146 A1* | 1/2015 | Boussand ............... | C09K 5/045 62/84 |

FOREIGN PATENT DOCUMENTS

| | | |
|---|---|---|
| WO | 90/05172 A1 | 5/1990 |
| WO | 2004/005441 A2 | 1/2004 |
| WO | 2008105366 A1 | 9/2008 |
| WO | 2013/110867 A1 | 8/2013 |
| WO | 2015109095 A1 | 7/2015 |

OTHER PUBLICATIONS

Weissler, Paul; "The Evolving A/C Service Picture: Getting From Here to There," Motor, Apr. 2012, 6 p.

Shrieve Chemical Products, Inc., International Search Report and Written Opinion dated Apr. 10, 2016, PCT App. No. PCT/US15/11608, 12 p.

European Patent Application No. 15737397.8 extended European search report dated Jun. 27, 2017 (5 pages).

\* cited by examiner

DESICATING SYNTHETIC REFRIGERATION OIL COMPOSITION FOR FLUORO-OLEFIN REFRIGERATION SYSTEMS

CROSS-REFERENCE TO RELATED APPLICATION

This application is the U.S. National Stage under 35 U.S.C. § 371 of International Patent Application No. PCT/US2015/011608 filed Jan. 15, 2015, which claims the benefit of U.S. Provisional Patent Application No. 61/928,331, filed Jan. 16, 2014, titled "Novel Desiccating Synthetic Refrigeration Oil Composition For Hydrofluoro-Olefin Refrigerant Based Refrigeration Systems." The disclosures of each of said applications are hereby incorporated herein by reference in their entireties.

TECHNICAL FIELD

This disclosure relates to a novel working fluid for compression refrigeration and similar systems, specifically for refrigeration and similar systems in which the refrigerant is a fluoro-olefin, especially a hydrofluoro-olefin (HFO). The disclosure also relates to a novel lubricant for use in such systems, and to a method of lubricating such systems.

BACKGROUND

The disclosure relates to a novel lubricating oil for the compressor of a refrigeration system. Typically a compression type refrigeration circuit comprises a compressor, a condenser, expansion device(s) and an evaporator. The refrigerant and compressor lubricant should most typically circulate throughout the system without phase separation. Potential consequences of phase separation may include inadequate lubrication of the compressor and reduced heat exchange efficiency. Lubricating oils for refrigeration systems most preferentially also demonstrate a high viscosity index, thus ensuring viscosity retention and hence adequate lubrication across the system's temperature range. Appropriate pressure, viscosity and temperature dynamics are required. Furthermore, an appropriate level of chemical, thermal and hydrolytic stability is required of the lubricant composition in contact with the refrigerant and system componentry across the operating temperature range. Most commonly a low level of hygroscopicity is also considered to be a requirement of the lubricant to limit potential of ice blockage of the expansion device and chemical instability due to potential component corrosion resulting from the formation of acidic species in the presence of excessive moisture levels.

Refrigerants composed partly or in entirety of fluoro-olefin ("fluoroalkene"), especially hydrofluoro-olefin type refrigerant, are under active development as a more environmentally friendly refrigerant for use in automotive and stationary air-conditioning and refrigeration systems. The novelty of this refrigerant type requires a refrigeration compressor lubricant affording properties specific to this refrigerant type, such properties specifically include appropriate refrigerant compatibility, and elevated levels of chemical, thermal and hydrolytic stability due to potential reactivity of the hydrofluoro-olefin refrigerant compared to traditional hydrofluorocarbon refrigerants. With an increasing automotive industry focus on utilizing hybrid and electric air-conditioning compressors to realize vehicle fuel savings, there is a further requirement that the lubricant technology defined for belt-driven compressors should be equally applicable for use in electrically driven compressors, where the electrical properties of the lubricant also require specification. Lubricant compositions considered suitable for use with the new hydrofluoro-olefin refrigerants include those with higher polarity and hence greater miscibility with the refrigerant, such as polyol esters (POEs) and polyalkylene glycols (also known as, and referred to herein as polyoxyalkylene glycols, PAGs) whereas less polar lubricant types such as mineral oils and alkylbenzenes lack the polarity required and hence demonstrate immiscibility with hydrofluoro-olefins.

Honeywell's US 2007/0069175 discloses mixtures of various fluoroalkene refrigerants with various lubricants which may include organic lubricants of the PAG and POE type. This document discloses a variety of lubricant types but does not demonstrate particular suitability of one lubricant type or denominations thereof, compared to another. US 2010/0205980 discloses that PAGs of a particular structure may serve as basefluids for use with a fluoro-olefin refrigerant.

Within the refrigeration industry, there is a strong antipathy to the use of mixed, or hybrid, lubricants. The use of mixtures of different lubricant base fluids can in some cases lead to serious disadvantages, and the predominant practice is to use a single base fluid as lubricant. Manufacturers of refrigeration equipment go to some lengths to ensure that during maintenance of their equipment, the correct base fluid is used, fearing that the use of a different base fluid from that used originally could cause damage.

US 2011/019-184 references MACS Service Report, March 2008, p. 1-8 by Weissler, saying: "Denso has shown that 1% of PAG oils (such as its ND8) in an electric motor-drive compressor system lowers resistance to about 1 megaohm, well below the over-10 megaohm provided by the usage of 100% of its ND11 oil, a POE." The Weissler report itself states: "When SAE J2788, the current standard for recovery/recycle/recharging equipment was written, we recognized the issue of oil cross-contamination in the electric-motor compressors of some hybrids. It obviously was important to minimize getting PAG into the POE oil . . . and it was for this reason that SAE J2788 sets a limit of 1%, well below some once-heard estimates that up to 8% could be tolerated. It turns out that both numbers were off the mark. The limit, along with a new, severe test, is likely to be going down to just 0.1% (100 parts per million of PAG in the POE oil), to leave a good margin for safety." This typifies certain prejudice in the art against the use of PAG and POE mixtures as base fluids for refrigeration systems.

However, disclosed herein is the use of POE/PAG mixtures of particular composition with fluoro-olefin, especially HFO, refrigerants that demonstrate a surprising effect which could not have been predicted. Specifically, the addition of a minor amount of a PAG to a POE base fluid has a hygroscopic or desiccant effect, which in turn reduces or eliminates the need to add acidity regulators to the POE base fluid when used with such refrigerants. This makes such mixtures particularly suitable for use with such refrigerants.

SUMMARY OF THE DISCLOSURE

Exemplary disclosed embodiments provide a working fluid for use in a compression refrigeration, air conditioning or heat pump system, comprising (A) a refrigerant comprising a fluoro-olefin, and (B) a lubricant which comprises a mixture of a polyol ester and a polyoxyalkylene glycol, said polyol ester being present in an amount of at least 50% by weight based on the total weight of the polyol ester and the polyoxyalkylene glycol.

Certain embodiments further provide compression refrigeration, air conditioning or heat pump systems, which comprise a compressor containing a working fluid according to the disclosure.

Embodiments herein disclose lubricants for use in a compression refrigeration, air conditioning or heat pump system, and in some embodiments, for use in such systems in which the refrigerant comprises a fluoro-olefin, in which said lubricant comprises at least 10% by weight of polyoxyalkylene glycol based on the total weight of the polyol ester and the polyoxyalkylene glycol.

Certain disclosed and exemplary embodiments also provide polyoxyalkylene glycol for use as a desiccant in a lubricant for compression refrigeration, air conditioning or heat pump systems, as disclosed herein. Certain exemplary embodiments further provide a polyoxyalkylene glycol for use as a desiccant in a working fluid according to the present disclosure.

DETAILED DESCRIPTION OF THE DISCLOSED EXEMPLARY EMBODIMENTS

The present disclosure relates to a synthetic lubricating oil for compressors of refrigeration systems. Most particularly the disclosure relates to a lubricating oil for refrigerators comprising as the main components a polyol ester and a polyoxyalkylene glycol, wherein both components have compatibility with hydrofluorocarbon type refrigerant compounds such as 1,1,1,2-tetra fluoroethane (herein after referred to as "R134a"), and more particularly compatibility with hydrofluoro-olefin type refrigerant compounds such as 2,3,3,3-tetrafluoro prop-1-ene (herein after referred to as "HFO 1234yf") or trans-1,3,3,3-tetrafluoroprop-1-ene (hereinafter referred to as "HFO-1234zeE"), and mixtures comprising hydrofluoro-olefin and hydrofluorocarbon refrigerants which may or may not additionally include carbon dioxide, saturated or unsaturated hydrocarbons of length $C_3$ to $C_6$, iodotrifluoromethane ($CF_3I$), perfluoroketones, hydrofluoroketones, hydrochlorofluoroketones, or hydrochlorofluoroolefins.

The refrigerant used in certain exemplary embodiments comprises a fluoro-olefin (which may alternatively be referred to as a fluoroalkene). In certain embodiments, the fluoro-olefin contains from 2 to 4 carbon atoms and at least one but no more than 2 double bonds. In certain embodiments, the fluoro-olefin is a hydrofluoro-olefin, preferably containing from 2 to 4 carbon atoms and at least one but no more than 2 double bonds, such as HFO 1234yf or HFO 1234zeE. Except where the context requires otherwise any reference herein to a fluoro-olefin should be construed as including a specific reference to an HFO and to each of those two specific refrigerants. The refrigerant may consist of a single fluoro-olefin or a mixture of two or more fluoro-olefins, or it may contain one or more fluoro-olefins in admixture with one or more other classes of refrigerant, for example one or more of those mentioned above. In one exemplary embodiment, the refrigerant is a fluoro-olefin, especially a hydrofluoro-olefin, especially HFO 1234yf or HFO 1234zeE, either alone or in admixture with a hydrofluorocarbon refrigerant, especially R134a.

In some embodiments, the synthetic lubricating composition disclosed herein demonstrates preferential properties for use with refrigerants comprised entirely or in part of hydrofluoro-olefin, which are further optimized with regard to chemical/thermal/hydrolytic stability and viscometric properties in comparison with traditional refrigeration lubricants for hydrofluorocarbon based systems (which are based in their entirety on either polyol esters or polyalkylene glycols with optional low level additisation).

Also disclosed herein is a lubricating oil for compression type refrigerators. In certain embodiments, the oil comprises as the main base oil components a polyol ester of at least 50%, preferably as a major component thereof and a polyoxyalkylene glycol in an amount of no more than 50%, preferably as a minor component thereof. In particular, in certain embodiments, the base oil component comprises at least 55% (by weight) of the polyol ester and at most 45% (by weight) of a polyoxyalkylene glycol, more preferably at least 65% (by weight) of the polyol ester and at most 35% (by weight) of a polyoxyalkylene glycol, and most especially between 70% and 80% (by weight) of the polyol ester and between 20% and 30% (by weight) of the polyoxyalkylene glycol. It is demonstrated herein that a particular combination of basefluids affords an unexpected desiccating benefit, resulting in enhanced system stability, which would not be predicted by consideration of the properties of the individual basefluid components. Furthermore, it is demonstrated that the said particular combination of base oil components also affords an unexpected and beneficial lubricant viscosity effect.

Except where otherwise stated or where the context requires otherwise, all proportions of POE and PAG throughout this Specification and claims are by weight based on the combined weight of POE and PAG.

In one embodiment, the PAG is present in an amount of at least 10% by weight. It may for example be present in an amount of at least 15% by weight, for example at least 16.7% by weight (as illustrated in Example 2 herein). Thus, in one embodiment, the percentage by weight of PAG in the POE:PAG mixture is from 10-50%, for example from 15-50%, for example from 16.7 to 50%, for example from 20-50%, for example from 35-50, for example from 45-50. The PAG may be present in a minor amount relative to the POE, in which case it is for example present in an amount from 10-45%, for example from 15-45%, for example from 16.7 to 45%, for example from 20-45%, for example from 35-45. Specific POE:PAG weight ratios include for example 90:10, 83.3:16.7, 80:20, 70:30, 65:35, 55:45 and 50:50. In some embodiments, having POE:PAG mixtures, the POE:PAG weight ratio is in the range of from 70:30 to 80:20.

Certain exemplary embodiments provide a lubricating oil for refrigeration compressors, providing a highthermal/chemical/hydrolytic stability with hydrofluoro-olefin type refrigerants by means of the specific basefluid combination providing a desiccating effect preventing reaction of moisture with the basefluid, thus preventing the formation of acidic species due to the existence of free moisture within the system. Certain exemplary embodiments not only provide such a favorable stability with HFO type refrigerants, but also provide a favorable lubricity property, contrary to that which would be reasonably expected based on the individual components, and which affords improved viscosity retention under refrigerant dilution and an unexpected viscosity retention under compressor bearing operating temperatures. The disclosure herein provides a combination of basefluid types and optional additive componentry designed to offer an optimized balance of properties desirable for use in HFO refrigeration and air-conditioning systems. As used herein, the term major in some embodiments describes a component that is present in at least 50% by weight, wherein a minor component in one embodiment is a component that is present in less than 50% by weight.

Certain exemplary embodiments specify a lubricating oil containing two basefluid types: generally, the major base oil component is a polyol ester, and the minor component thereof is a polyoxyalkylene glycol. In particular, in certain embodiments, the base oil comprises at least 55% (by weight) of the polyol ester and at most 45% (by weight) of a polyoxyalkylene glycol, more preferably at least 65% (by weight) of the polyol ester and at most 35% (by weight) of a polyoxyalkylene glycol, and most especially between 70% and 80% (by weight) of the polyol ester and between 20% and 30% (by weight) of the polyoxyalkylene glycol.

Basefluid I: Comprising as the main component in this exemplary embodiment at least one polyol ester, especially one made by the reaction of polyhydric alcohols and monobasic carboxylic acids. Certain disclosed polyol esters are made by the reaction of one or more polyhydric alcohols selected from neopentylglycol (NPG), tri-methylolpropane (TMP) and pentaerythritol (PE) or dimers and trimers thereof, and one or more linear and/or branched acids with carbon numbers $C_5$ to $C_{15}$, particularly $C_5$ to $C_{13}$, and most preferentially $C_5$-$C_9$.

The polyol ester component of the base fluid may comprise a single POE or a mixture of different POEs.

Certain disclosed polyol esters have an acid number of less than 0.05 mgKOH/g.

Certain disclosed polyol esters have a viscosity at 40° C. of 22-170 cSt, more preferably 46-100, and most preferably 60-90 cSt.

Certain disclosed polyol esters have a viscosity index of greater than 95.

Certain disclosed polyol esters demonstrate full miscibility with an HFO refrigerant, especially HFO 1234yf/ze, at temperatures below 50° C. across the lubricant concentration range of 0.01-100.0 wt % in the refrigerant.

Certain disclosed polyol esters have a volume resistivity of greater than $1 \times 10^{10}$ ohm cm.

Basefluid II: Comprising as the minor component in this exemplary embodiment at least one polyoxyalkylene glycol, especially a PAG derivative represented by the general formula:

$$RX(R^aO)_yR^b$$

wherein:
R is an alkyl group containing 1-10 carbon atoms, an acyl group having 1-10 carbon atoms, or a heterocyclic ring substituent of 3-12 carbon atoms, wherein the heteroatom is preferably oxygen but may be sulphur;
X=O
$R^a$ is a $C_2$ and/or $C_3$ alkylene group
$R^b$ is an alkyl group containing 1-10 carbon atoms, an acyl group having 1-10 carbon atoms, or a heterocyclic ring substituent of 3-12 carbon atoms, wherein the heteroatom is preferably oxygen but may be sulphur
R and $R^b$ may be the same or different
either R or $R^b$ may also be hydrogen, but both may not be hydrogen.
y=5 to 100.
$R^a$ may be a $C_2$ alkylene group or a $C_3$ alkylene group or a mixture of $C_2$ and $C_3$ alkylene groups. In some embodiments, $R^a$ is a $C_3$ alkylene group. In some embodiments, both of R and $R^b$ are other than hydrogen. In some embodiments, at least one both, of R and $R^b$ is an alkyl group containing 1-10 carbon atoms, especially 1-4, carbon atoms. When both of R and $R^b$ represent such a group, these may be the same or different, but they are the same in some embodiments. In at least one embodiment, R is a $C_1$ or $C_4$ alkyl group and $R^b$ is a $C_1$ or $C_4$ alkyl group or a hydrogen atom, especially a $C_1$ or $C_4$ alkyl group.

The polyoxyalkylene glycol component of the base fluid may comprise a single PAG or a mixture of different PAGs.

Certain disclosed polyoxyalkylene glycols have an acid number of less than 0.05 mgKOH/g.

Certain disclosed polyoxyalkylene glycols have a viscosity index of greater than 160.

Certain disclosed polyoxyalkylene glycols have a viscosity at 40° C. of 32-150, more preferably 32-100 and most preferably 46-80 cSt.

Certain disclosed polyoxyalkylene glycols demonstrate full miscibility with HFO refrigerants, especially refrigerant HFO 1234yf, at temperatures below 10° C. across the lubricant concentration range of 0.01-100.0 wt % in the refrigerant.

Certain disclosed polyoxyalkylene glycols have a volume resistivity of greater than $1 \times 10^7$ ohm cm.

The polyolefin ester and the polyalkylene glycol are the only lubricating oils present in the compositions of certain of the exemplary embodiments described herein. The lubricant composition may however also comprise one or more additives of known functionality, for example at levels in the range 0.001%-25.0% (by weight based on the total weight of POE plus PAG), more preferably in the range 0.01-15.0% (by weight) and most preferably in the range 0.05-5.0% (by weight). Appropriate additives include extreme pressure agents, antiwear agents, antioxidants, and corrosion inhibitors. Other additives may optionally include metal passivators, antifoams and acidity regulators. In some embodiments, at least one additive is included which is selected from antiwear or extreme pressure additives, antioxidants, corrosion inhibitors and acid scavengers. For example, the lubricant may comprise at least one antioxidant selected from the group consisting of benzenepropanoic acid, 3,5-bis(1,1-dimethyl-ethyl)-4-hydroxy, $C_7$-$C_9$ branched alkyl esters, and benzenamine, —N-phenyl,-reaction products with 2,4,4-trimethylpentene; at least one corrosion inhibitor selected from the group consisting of isomeric mixtures of N,N-bis(2-ethylhexyl)-4-methyl-1H-benzotriazole-1-methylamine and N,N-bis(2-ethylhexyl)-5-methyl-1H-benzotriazole-1-methaylamine; an extreme pressure or antiwear additive selected from the group consisting of $C_{11-14}$-branched alkyl amines, monohexyl and dihexyl phosphates; and/or an acid scavenger comprising an epoxide functionality.

An antioxidant, if present, may be present in an amount of up to 4%, for example from 0.1 to 2%, for example from 0.2 to 0.8%, by weight based on the total weight of POE plus PAG. A corrosion inhibitor, if present, may be present in an amount of up to 1%, for example from 0.01 to 0.5%, for example from 0.05 to 0.15% by weight based on the total weight of POE plus PAG. An extreme pressure or antiwear additive, if present, may be present in an amount up to 1%, for example from 0.01 to 0.5%, for example from 0.05 to 0.15% by weight based on the total weight of POE plus PAG.

It is an advantage to reduce or eliminate the need for acid scavengers compared with the use of lubricants in which the base fluid is POE alone. In some embodiments, the lubricants of certain embodiments disclosed herein contain less than 10%, especially less than 5%, by weight of acid scavengers. In some embodiments, the compositions are free from acid scavengers.

Certain disclosed polyoxyalkylene glycols are purified such that the cation content is less than 30 ppm, for example less than 20 ppm, especially less than 10 ppm.

The base fluid is suitably dried using enhanced drying techniques to reduce the moisture content. It may for example be dried to a moisture content of less than 300 ppm, for example less than 200 ppm, for example less than 100 ppm.

All parameters mentioned herein may be measured using industry standard tests. For example, total acid value (mg-KOH/g) is measured using ASTM Method D974. Moisture content (ppm) is measured using ASTM Method E203. Viscosity is measured using ASTM Method D445. Viscosity Index is measured using ASTM Method D2270. Volume Resistivity is measured using IEC 247.

The lubricant is present in a refrigeration, air conditioning or heat pump system in an amount sufficient to provide effective lubrication. This amount may for example be up to 50%, for example up to 25%, preferably up to 10% by weight based on the weight of the refrigerant. The lubricant composition is suitably capable of maintaining a single liquid phase with the refrigerant, particularly an HFO refrigerant and particularly with HFO 1234yf and HFO 1234zeE, within a temperature range of from −60° C. to +10° C.

Exemplary embodiments disclosed herein have utility in any refrigeration, air conditioning or heat pump system, especially in motor-integrated compressors, for example automotive or electrically driven compressors, in which high-purity basefluids are required, because the basefluid requires good electrical properties when it is in direct contact with motor windings.

Some specific lubricating compositions according to this disclosure include the following:
1) A 50:50, 75:25 or 80:20 mix of a POE which is a polyol ester made by the reaction of polyhydric alcohols and linear/branched acids with carbon numbers within the range $C_5$ to $C_{15}$; with a PAG of the formula $RX(R^aO)_yR^b$
wherein:
R is a simple alkyl group containing <5 carbon atoms
X=O
$R^a$ is a $C_3$ alkylene group
$R^b$ is hydrogen.
Y is an integer within the range 5 to 100, to afford a viscosity at 40° C. of 60.0 cSt.
2) An 80:20 mix of a POE based on pentaerythritol, utilizing monobasic branched $C_8$ and $C_9$ acids; with a PAG as defined in (1) above.
3) A mix of 80% of a POE as defined in (1) above with 5% of a PAG as defined above and 15% by weight of a PAG composition which includes PAG of the formula $RX(R^aO)_yR^b$
wherein:
R is a methyl group.
X=O
$R^a$ is a $C_3$ alkylene group
$R^b$ is a methyl group
Y is an integer within the range 5 to 100, to afford a viscosity at 40° C. of 46.0 cSt; and also includes additisation totalling 22.1 weight %, of which >9.0 weight % is acid regulator.

Each of these specific compositions may be mixed with a suitable refrigerant, especially a HFO refrigerant, including one with HFO 1234yf, to form a working fluid according to this disclosure.

Some aspects and exemplary embodiments are listed below. In one embodiment a lubricant basefluid for use in conjunction with fluoroalkene refrigerant in refrigeration/air-conditioning systems is disclosed, whereby the lubricant comprises (as the main base oil components) a polyol ester as a major component thereof and a polyoxyalkylene glycol as a minor component thereof. In particular the base oil component comprises at least 55% (by weight) of the polyol ester and at most 45% (by weight) of a polyoxyalkylene glycol, more preferably at least 65% (by weight) of the polyol ester and at most 35% (by weight) of a polyoxyalkylene glycol, and most especially between 70% and 80% (by weight) of the polyol ester and between 20% and 30% (by weight) of the polyoxyalkylene glycol. Most particularly the polyoxyalkylene glycol component is present at a concentration sufficient to enable full desiccation of ingressed moisture from the major POE component. In another embodiment of the lubricant basefluid, the main component comprises at least one polyol ester made by the reaction of polyhydric alcohols and monobasic acids. In further embodiment, at least one polyol ester is made by the reaction of one or more polyhydric alcohols selected from neopentylglycol (NPG), tri-methylolpropane (TMP) and pentaerythritol (PE) or dimers and trimers thereof, and one or more linear and/or branched acids with carbon numbers C5 to C15, particularly C5 to C13, and most preferentially C5-C9. In another embodiment of the lubricant basefluid the minor component comprises at least one polyoxyalkylene glycol derivative represented by the general formula:

$$RX(R^aO)_yR^b$$

wherein:
R is an alkyl group containing 1-10 carbon atoms, an acyl group having 1-10 carbon atoms, or a heterocyclic ring substituent of 3-12 carbon atoms, wherein the heteroatom is preferably oxygen but may be sulphur.
X=O
$R^a$ is a C2 and/or C3 alkylene group
$R^b$ is an alkyl group containing 1-10 carbon atoms, an acyl group having 1-10 carbon atoms, or a heterocyclic ring substituent of 3-12 carbon atoms, wherein the heteroatom is preferably oxygen but may be sulphur.
R and $R^b$ may be the same or different.
Either R or $R^b$ may also be hydrogen, but both may not be hydrogen.
Y=5 to 100.
More specifically wherein R is a C1 or C4 alkyl group, $R^a$ is a C3 alkylene group, and $R^b$ is a C1 alkyl group, C4 alkyl group, or hydrogen. In another embodiment of the lubricant basefluid the polyol ester and the polyoxyalkylene glycol both have an acid number of less than 0.05 mgKOH/g respectively, and in a further embodiment the polyol ester and the polyoxyalkylene glycol have a kinematic viscosity at 40° C. of 22-170 cSt and 32-150 cSt respectively.

In an embodiment of the lubricant basefluid, the polyol ester and the polyoxyalkylene glycol have a viscosity index of greater than 95 and 160 respectively.

In another embodiment of the lubricant basefluid, the polyol ester and the poloxyalkylene glycol have a volume resistivity of greater than $1 \times 10^{10}$ ohm cm and $1 \times 10^7$ ohm cm respectively.

In further embodiment a the lubricant basefluid the polyol ester and the poloxyalkylene glycol demonstrate full miscibility with refrigerant HFO 1234yf at temperatures below 50° C. and below 10° C. respectively, across the lubricant concentration range of 0.01-100.0 wt % in the refrigerant.

In another embodiment, a working fluid composition for use in compression refrigeration, air conditioning and heat pump systems comprising (A) a refrigerant composed partly or in entirety of fluoroalkene containing from 2 to 4 carbon atoms and at least one but no more than 2 double bonds, and (B)

an effective amount of the lubricant composition of claim 1 to provide lubrication is disclosed.

In one embodiment of the working fluid, the refrigerant comprises 2,3,3,3-tetrafluoro prop-1-ene hydrofluoro-olefin. In another embodiment of the working fluid, refrigerant comprises trans-1,3,3,3-tetrafluoro prop-1-ene hydrofluoro-olefin, and in a further embodiment of the working fluid, the refrigerant comprises a blend containing 2,3,3,3-tetrafluoro prop-1-ene hydrofluoro-olefin, and one or more from the selection of hydrofluorocarbons, carbon dioxide, iodotrifluoromethane ($CF_3I$), perfluoroketones, hydrofluoroketones, hydrochlorofluoroketones, or hydrochlorofluoroolefins.

In a still further embodiment of the working fluid, the refrigerant comprises a blend containing trans-1,3,3,3-tetrafluoro prop-1-ene hydrofluoro-olefin, and one or more from the selection of hydrofluorocarbons, carbon dioxide, iodotrifluoromethane ($CF_3I$), perfluoroketones, hydrofluoroketones, hydrochlorofluoroketones, or hydrochlorofluoroolefins, and in another embodiment, the refrigerant comprises carbon dioxide.

A compression-type refrigerator system, is also disclosed in embodiments described herein, wherein the system comprises a compressor, a fluoroalkene or hydrofluorocarbon type refrigerant or mixture thereof, and a lubricant, wherein said lubricant comprises a lubricating base oil wherein the base oil comprises at least 55% (by weight) of the polyol ester and at most 45% (by weight) of a polyoxyalkylene glycol, more preferably at least 65% (by weight) of the polyol ester and at most 35% (by weight) of a polyoxyalkylene glycol, and most especially between 70% and 80% (by weight) of the polyol ester and between 20% and 30% (by weight) of the polyoxyalkylene of glycol. Most particularly the polyoxyalkylene glycol component is present at a concentration sufficient to enable full desiccation of ingressed moisture from the major POE component.

FURTHER EXAMPLES

In the following examples, the weight percentages given in the Tables are based on the weight of the actual commercial products used, i.e., they include the weight of any additives present.

Example 1

Demonstration of Unexpected Viscosity Effect

Testing is performed in full accordance with specified methods.

PAG 1 is RL897 from Dow, a commercially available polyoxyalkylene glycol utilized in HFC type air-conditioning systems, and is represented by the formula $RX(R^aO)_yR^b$ wherein:

R is a simple alkyl group containing <5 carbon atoms, specifically, a butyl group.

X=O $R^a$ is a $C_3$ alkylene group $R^b$ is hydrogen.

Y is an integer within the range 5 to 100, to afford a viscosity at 40° C. of 60.0 cSt.

PAG 1 does not contain any additisation.

POE 1 is Emkarate RL85HM from CPI Engineering, a developmental polyol ester made by the reaction of polyhydric alcohols and linear/branched acids with carbon numbers within the range $C_5$ to $C_{15}$ POE 1 does not contain any additisation.

50/50 wt/wt POE 1/PAG 1 and 75/25 wt/wt POE 1/PAG 1 blends demonstrate viscometric properties which are contrary to the values reasonably expected of these simple blends (and demonstrated by calculation), such contrary viscometric properties of these specific blends would not be predictable to one skilled in the art. A predominance of PAG influence on the viscosity of the blends is observable, indicated by lower than anticipated viscosity at 40° C. and higher than expected viscosity index. The greater than expected retention of PAG lubricity and viscosity tolerance to temperature of the blends is simply demonstrated by the improved retention of viscosity index of both the 50/50 and 75/25 POE 1/PAG 1 blends versus calculated values. This observation of non-linear viscometric properties of the blends derived from two components of known viscometrics, is of significant benefit in the intended application, and indicative of better lubricity maintenance at compressor bearing operating conditions.

For comparison, tests were conducted using mixtures with a major proportion of PAG and a minor proportion of POE. A mixture with a weight ratio of POE:PAG of 45:55 has a measured (ASTM D2270) viscosity index of 147, virtually identical to the calculated value of 146; while a mixture with a weight ratio of POE:PAG of 25:75 had a measured (ASTM D2270) viscosity index of 159, virtually identical to the calculated value of 160.

| Property | Method | PAG 1 | POE 1 | 50/50 wt/wt POE 1/PAG 1 | CALCULATED 50/50 wt/wt POE 1/PAG1 | 75/25 wt/wt POE 1/PAG1 | CALCULATED 75/25 wt/wt POE 1/PAG1 |
|---|---|---|---|---|---|---|---|
| Viscosity at 40° C. (cSt) | ASTM D445 | 60.0 | 85.7 | 62.1 | 71.5 | 67.8 | 78.2 |
| Viscosity at 100° C. (cSt) | ASTM D445 | 11.0 | 10.9 | 10.3 | 10.95 | 10.2 | 10.93 |
| Viscosity Index | ASTM D2270 | 178 | 113 | 154 | 143 | 136 | 128 |
| Volume Resistivity (ohm cm) | IEC 247 | $1.5 \times 10^8$ (335 ppm water) | $0.6 \times 10^{12}$ (48 ppm water) | $0.7 \times 10^{11}$ (233 ppm water) | — | $0.8 \times 10^{10}$ (210 ppm water) | — |

Example 2

Demonstration of Unexpected Desiccant Effect:
Ashrae 97 Sealed Glass Tube Stability Test

| | | | | | | | | | | Post-test lubricant Total Acid Value (mgKOH/g) | | |
|---|---|---|---|---|---|---|---|---|---|---|---|---|
| | | | Oil type, and weight % of base oil | | | | | | | Evacuated sample | | Spec max (800 ppm |
| Sample No | % PAG | % POE | PAG 1 (no AR) | PAG 2 (no AR) | PAG 3 (no AR) | PAG 3 (+AR) | POE 3 (no AR) | POE 2 (no AR) | POE 1 (no AR) | (<50 ppm water) | 200 ppm water | POE/2000 ppm PAG) |
| 1 | 100 | 0 | | | 100.0 | | | | | 1.50 | | |
| 2 | 100 | 0 | | | | 100.0 | | | | 0.00 | | |
| 3 | 100 | 0 | | | | 100.0 | | | | | | 0.46 |
| 4 | 0 | 100 | | | | | | | 100.0 | | 1.10 | |
| 5 | 0 | 100 | | | | | | 100.0 | | | 0.08 | |
| 6 | 0 | 100 | | | | | | | 100.0 | | | 2.30 |
| 7 | 0 | 100 | | | | | | 100.0 | | | | 0.44 |
| 8 | 0 | 100 | | | | | | 100.0 | | | | 0.42 |
| 9 | 0 | 100 | | | | | | 50.0 | 50.0 | | | 1.90 |
| 10 | 0 | 100 | | | | | | | 100.0 | 0.11 | | |
| 11 | 0 | 100 | | | | | | 100.0 | | 0.17 | | |
| 12 | 0 | 100 | | | | | 100.0 | | | 0.49 | | |
| 13 | 0 | 100 | | | | | 100.0 | | | 0.86 | | |
| 14 | 0 | 100 | | | | | | | 100.0 | 0.32 | | |
| 15 | 0 | 100 | | | | | | 100.0 | | 0.27 | | |
| 16 | 20 | 80 | 20.0 | | | | | | 80.0 | | | 0.00 |
| 17 | 20 | 80 | 5.0 | | 15.0 | | | | 80.0 | | | 0.00 |
| 18 | 20 | 80 | 20.0 | | | | | 80.0 | | 0.00 | | |

NOTE:
AR denotes inclusion or otherwise of further Acidity Regulator.

Testing was conducted in accordance with Ashrae 97 Sealed Glass Tube Test, which is the standard test for determining the stability of refrigeration system components such as refrigerant, lubricant, and elastomeric/metallic components. It requires heating the components in a sealed glass environment for 14 days at 175° C., Cu/Al/Fe coupons present. HFO 1234yf refrigerant present.

PAG 2 is ND8 from Idemitsu, a commercially available polyoxyalkylene glycol utilized in HFC type air-conditioning systems, and is represented by the formula $RX(R^aO)_yR^b$ wherein:
R is a methyl group.
X=O
$R^a$ is a $C_3$ alkylene group
$R^b$ is a methyl group.
Y is an integer within the range 5 to 100, to afford a viscosity at 40° C. of 46.0 cSt.
PAG 2 does not contain any additisation.
PAG 3 is PSD1 from Idemitsu, a polyoxyalkylene glycol developed for use in HFO type air-conditioning systems, and is represented by the formula $RX(R^aO)_yR^b$
wherein:
R is a methyl group.
X=O
$R^a$ is a $C_3$ alkylene group
$R^b$ is a methyl group.
Y is an integer within the range 5 to 100, to afford a viscosity at 40 deg C. of 46.0 cSt.
PAG 3 contains additisation totalling 22.1 weight %, of which >9.0 weight % is acid regulator (prior to further acidity regulator addition during test). This means that the actual weight ratio of POE to PAG in Sample 17 is 16.7% based on the total weight of POE and PAG.
POE 2 is Emkarate RL68HB from CPI Engineering, a commercially available POE utilized in HFC based air-conditioning and refrigeration systems, and is based on pentaerythritol, utilizing monobasic branched $C_8$ and $C_9$ acids. Additisation is not present.

POE 3 is ND11 from Idemitsu, a commercially available POE utilized in motor integrated compressors for HFC based air-conditioning systems, and is based on a mixture of pentaerythritol and its dimer, utilizing monobasic branched $C_8$ and $C_{11}$ acids. Additisation is present in the form of butylated hydroxytoluene (1.0 wt %) antioxidant, and extreme pressure agent tricresylphosphate at 1.0 wt %.

Data of Example 2 demonstrates an absence of Acid Formation for exemplary embodiment of a lubricant comprising basefluid I and basefluid II, as demonstrated by samples 16-18. Acid generation occurs as a result of a reverse esterification process, whereby polyol ester is reactive with water to generate acidic species, as demonstrated by neat POE lubricant samples 4-15. Chemical instability associated primarily with the reactivity of refrigerant HFO 1234yf in the presence of moisture has similar consequence in neat PAG samples, though to a lesser degree as acidic species are not a primary consequence of PAG degradation to the extent observed with POE, therefore Total Acid Value is also associated and measurable for post-test lubricant samples 1 and 3. An absence of post-test Acid Value for sample 2 is attributable to the total dosage of acidity regulator utilized in the test (>9.0 weight % prior to further acidity regulator addition for test). It is concluded that the hygroscopicity effect of the PAG, whereby ingressed moisture is hydrogen bonded to the Polyoxyalkylene Glycol ether linkages, is serving as a desiccant effect which results in an absence of reverse esterification of the polyol ester component, and thereby results in an absence of acidic species generation. Thus it is concluded that the lubricant composition of exemplary embodiments of this disclosure is advantageous in eliminating the requirement for significant dosages of acidity regulator in HFO 1234yf systems, which when utilized at excessive dosages may result in incompatibility with elastomeric components (hoses/seals) of refrigeration circuits.

The invention claimed is:

1. A working fluid for use in a compression refrigeration, air conditioning or heat pump system, comprising (A) a refrigerant comprising at least one of 2,3,3,3-tetrafluoro prop-1-ene hydrofluoro-olefin (HFO 1234yf) and trans-1,3,3,3-tetrafluoro prop-1-ene hydrofluoro-olefin (HFO-1234zeE), and (B) a lubricant which comprises a mixture of a polyol ester and a polyoxyalkylene glycol, in a weight ratio of 50:50 to 80:20; wherein the polyol ester is preparable by reaction of a polyhydric alcohol and an acid with carbon number within the range $C_5$ to $C_{15}$; and the polyoxyalkylene glycol being of the formula $RX(R^aO)_yR^b$
wherein:
R is an alkyl group containing <5 carbon atoms,
X=O,
$R^a$ is a $C_3$ alkylene group,
$R^b$ is hydrogen, and
Y is an integer within the range 5 to 100.

2. The working fluid of claim 1, wherein the weight ratio of the polyol ester to the polyoxyalkylene glycol is 50:50, 75:25, or 80:20.

3. The working fluid of claim 1, in which the polyol ester is preparable by the reaction of one or more polyhydric alcohols selected from neopentylglycol, tri-methylolpropane and pentaerythritol or dimers and trimers thereof, and one or more monobasic acids with carbon numbers $C_5$ to $C_{15}$.

4. The working fluid of claim 1, wherein the polyol ester and the polyoxyalkylene glycol each has an acid number of less than 0.05 mgKOH/g.

5. The working fluid of claim 1, wherein the polyol ester and the polyoxyalkylene glycol have a kinematic viscosity at 40° C. of 22-170cSt and 32-150cSt respectively.

6. The working fluid of claim 1, wherein the polyol ester and the polyoxyalkylene glycol have a viscosity index of greater than 95 and 160 respectively.

7. The working fluid of claim 1, wherein the polyol ester and the polyoxyalkylene glycol have a volume resistivity of greater than $1\times10^{10}$ ohm cm and $1\times10^7$ ohm cm respectively.

8. The working fluid of claim 1, wherein the lubricant further comprises one or more additives selected from extreme pressure agents, antiwear agents, antioxidants, corrosion inhibitors, metal passivators, antifoams and acidity regulators.

9. The working fluid of claim 1, wherein the refrigerant comprises in addition to the fluoro-olefin one or more additional refrigerants selected from hydrofluorocarbons, carbon dioxide, iodotrifluoromethane, perfluoroketones, hydrofluoroketones, hydrochlorofluoroketones, and hydrochlorofluoroolefins.

10. The working fluid of claim 1, wherein the refrigerant also comprises a hydrofluorocarbon refrigerant.

11. A compression refrigeration, air conditioning or heat pump system, which comprises a compressor containing the working fluid of claim 1.

12. A lubricant for use in a compression refrigeration, air conditioning or heat pump system, comprising: a mixture of a polyol ester and a polyoxyalkylene glycol in a weight ratio of 50:50 to 80:20; the polyol ester being preparable by reaction of a polyhydric alcohol and an acid with carbon number within the range $C_5$ to $C_{15}$; and the polyoxyalkylene glycol being of the formula $RX(R^aO)_yR^b$
wherein:
R is an alkyl group containing <5 carbon atoms,
X=O,
$R^a$ is a $C_3$ alkylene group,
$R^b$ is hydrogen, and
Y is an integer within the range 5 to 100.

13. A lubricant as claimed in claim 12, for use in a compression refrigeration, air conditioning or heat pump system together with a refrigerant comprising a fluoro-olefin.

14. A polyoxyalkylene glycol for use as a desiccant in a lubricant for a compression refrigeration, air conditioning or heat pump system, comprising the lubricant of claim 12.

15. A polyoxyalkylene glycol for use as a desiccant in a working fluid for a compression refrigeration, air conditioning or heat pump system, comprising the working fluid of claim 1.

16. The working fluid of claim 2, in which the polyol ester is preparable by the reaction of one or more polyhydric alcohols selected from neopentylglycol, tri-methylolpropane and pentaerythritol or dimers and trimers thereof, and one or more monobasic acids with carbon numbers $C_5$ to $C_{15}$.

* * * * *